(12) United States Patent
Alm

(10) Patent No.: US 6,746,187 B2
(45) Date of Patent: Jun. 8, 2004

(54) EDGE PROTECTION DEVICE FOR HOLE SAW

(75) Inventor: Sture Alm, Lidköping (SE)

(73) Assignee: Kapman AB, Sandviken (SE)

( * ) Notice: Subject to any disclaimer, the term of this patent is extended or adjusted under 35 U.S.C. 154(b) by 0 days.

(21) Appl. No.: 10/149,287

(22) PCT Filed: Jan. 11, 2001

(86) PCT No.: PCT/SE01/00041
§ 371 (c)(1),
(2), (4) Date: Oct. 3, 2002

(87) PCT Pub. No.: WO01/51248
PCT Pub. Date: Jul. 19, 2001

(65) Prior Publication Data
US 2003/0077138 A1 Apr. 24, 2003

(30) Foreign Application Priority Data
Jan. 11, 2000 (SE) .............................................. 0000062

(51) Int. Cl.⁷ .............................................. B23B 51/04
(52) U.S. Cl. .................... 408/241; 408/204; 30/504; 150/161
(58) Field of Search ............................ 408/241 R, 204, 408/703; 175/307; 30/504; 150/154, 161

(56) References Cited

U.S. PATENT DOCUMENTS

| 1,652,283 | A |   | 12/1927 | Lewis |
|---|---|---|---|---|
| 2,177,531 | A |   | 10/1939 | Maxwell |
| 2,439,568 | A | * | 4/1948 | Hall .......................... 150/161 |
| 3,329,188 | A | * | 7/1967 | McCord, Jr. ................ 30/521 |
| 5,205,685 | A |   | 4/1993 | Herbert |
| 6,458,448 | B1 | * | 10/2002 | Hunt .......................... 428/192 |

FOREIGN PATENT DOCUMENTS

GB    2 323 549    9/1998

* cited by examiner

Primary Examiner—Steven C. Bishop
(74) Attorney, Agent, or Firm—Burns, Doane, Swecker & Mathis, L.L.P.

(57) ABSTRACT

A circular hole saw blade is provided with a removable edge protector. The edge protector is in the form of a cylindrical loop of stiff elastic polymer material inserted coaxially into the blade alongside an inner cylindrical surface thereof. The loop has an inner axial end situated inside of the blade and an outer axial end disposed axially outwardly of the cutting teeth of the blade.

17 Claims, 1 Drawing Sheet

EDGE PROTECTION DEVICE FOR HOLE SAW

BACKGROUND

Hole saws comprise an arbor, which can be attached with one end to a power drill, and a hole saw blade and a center drill at the opposite end of the arbor. The hole saw blade comprises a toothed cylinder part and a round top plate. Since wear during use is concentrated to the hole saw blade, and since one may wish to drill different size holes, hole saw blades with different diameters are sold separate from the arbors.

Flat saw blades can easily be packaged separately or together in simple flat packages to prevent the teeth from damaging or becoming damaged by other tools in a tool box. Hole saw blades can only be packaged together if they have different diameters, and box-type packages for them have a disadvantage that the diameter and state of wear cannot be inspected without opening the box.

The present invention concerns an edge protector for hole saw blades, which will protect the blades from damaging or being damaged by other tools in a tool box when stored without other packaging, and which is suitable for displaying on a wall at retailers or tool suppliers.

BRIEF DESCRIPTION OF THE DRAWINGS

The invention is described with reference to the figures, where.

DESCRIPTION OF PREFERRED EMBODIMENTS OF THE INVENTION

The hole saw blade comprises a cylindrical toothed sawing part 11 welded to a circular plate 12 which at its center has a threaded hole 14 for attachment to an arbor, and near this, one or more holes for coupling pins which transmit torque to the hole saw blade. The hole saw blade can be made with oblique slots 13 to permit transfer of chips between the outside and the inside of the blade.

Figure 2:
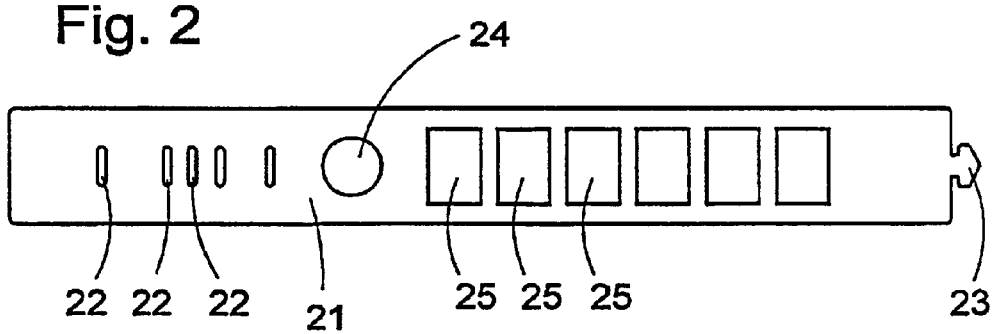

The edge protector comprises as shown in FIG. 2 a strip of a stiff elastic polymer with a width slightly exceeding the height of the sawing part 11. At one end the strip has a flap 23 which can be inserted into one among a multitude of slots 22 close to the other end to form a loop with such a diameter that it can be located to fit into the hole saw blade. Because of the greater width of the strip it will then protrude outside the saw teeth so far, preferably 3 to 10 mm, that they are protected from impact with hard items. On that side of the strip which after the insertion will be visible on the inside, it is suitable to print written or illustrated information 25 about the proper use of the hole saw.

Figure 3:
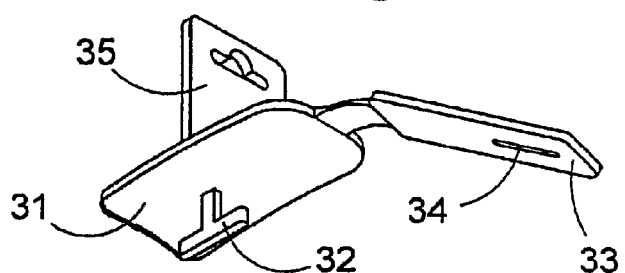
Figure 1:
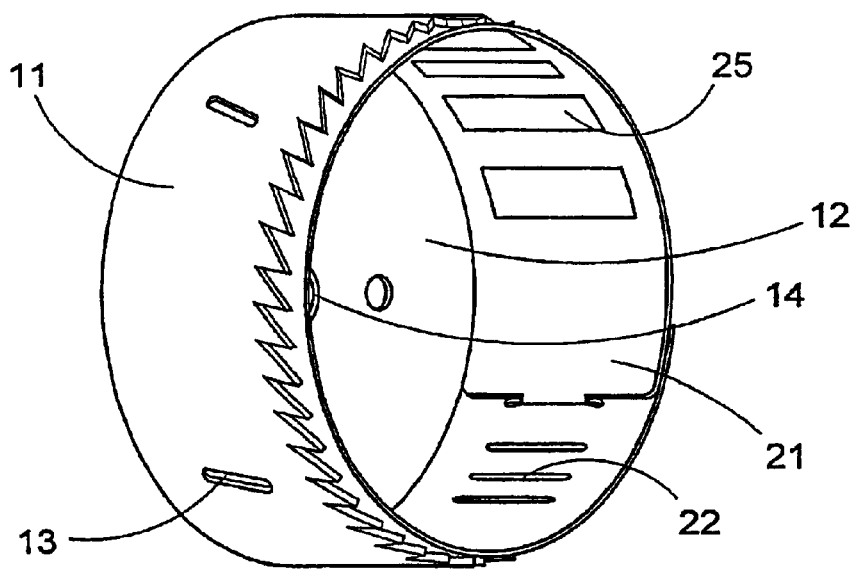
FIG. 1 shows a hole saw blade with an edge protector according to the invention, FIG. 2 the edge protector when it is not yet applied to the hole saw blade, FIG. 3 a suspension device to be used together with the edge protector.

The edge protector is preferably combined with a suspension device according to FIG. 3, comprising a slightly capped plate 31 with a claw 32 which can be pushed simultaneously through one of the oblique slots 13 and a slightly larger hole 24 through the strip 31. The claw 32 is axially oriented but the oblique slot 13 is not, and the plate has to be rotated when the claw penetrates the oblique slot, and is after that axially aligned again. The plate has on its top side a suspension member 35 with a cut-out which fits commonly used suspension pegs. A locking clip 33 is flexibly connected to the suspension member and can be bent around the edge of the strip 21 to receive the claw in a slot 34 to prevent the claw 32 from twisting out of the oblique slot 13. The suspension member can be combined with other tags or stickers to carry information about price, manufacturer and similar.

What is claimed is:

1. An edge protector for a hole saw blade, where the hole saw blade comprises a cylindrical toothed part attached to a circular plate characterized by the edge protector comprising a strip of a stiff elastic polymer material which can be assembled to a loop fitting into the cylindrical toothed part, and the strip having a width exceeding the height of the cylindrical toothed part by 3 to 10 mm.

2. An edge protector according to claim 1, characterized by the strip having a flap which can be inserted in a slot to form a loop of suitable diameter.

3. An edge protector according to claim 2, characterized by the strip having several slots corresponding to different diameters.

4. An edge protector according to claim 2, characterized by the strip having a hole which can be located over an oblique slot in the cylindrical toothed part to let a part of a suspension device penetrate through the hole and the slot.

5. An edge protector according to claim 4, characterized by the part penetrating the oblique slot and the hole being a claw, which after it has been rotated relative to the oblique slot can support the hole saw blade.

6. An edge protector according to claim 2, characterized by the part of the strip which is visible after insertion in the hole saw blade being provided with information.

7. The edge protector according to claim 1 wherein the loop defines a center axis and an outer free end disposed axially outside of the toothed part, the outer free end facing in an axial direction away from the circular plate.

8. In combination, a hole saw blade and a removable edge protector therefor; the saw blade comprising a cylindrical part defining a center axis and first and second axial ends, cutting teeth formed on the first axial end, and a circular plate attached to the second axial end; the edge protector comprising a cylindrical loop of stiff elastic polymer material disposed coaxially within the cylindrical part and disposed alongside an inner cylindrical surface of the cylindrical part, the loop having an inner axial end disposed within the hole saw blade and an outer axial end disposed axially outwardly of the cutting teeth.

9. The combination according to claim 8 wherein the outer axial end of the loop is spaced axially outwardly of the cutting teeth by a distance in the range of 3 to 10 mm.

10. The combination according to claim 8 wherein the loop comprises a strip having a flap disposed at one end thereof, the flap inserted within a slot formed in another end of the strip.

11. The combination according to claim 10 wherein the strip has a plurality of slots for selectively receiving the flap to vary a diameter of the loop.

12. The combination according to claim 8 further including a suspension device for suspending the hole saw blade; wherein the cylindrical part has a slot formed therein, the loop having a hole aligned with the slot, a suspension part of the suspension device projecting through the slot and the hole.

13. The combination according to claim 12 wherein the suspension device further includes a locking clip bent around the axially outer end of the loop and entering an interior of the loop, the locking clip including a slot receiving an end of the suspension part of the suspension device which has passed through the slot and the hole.

14. The combination according to claim 12 wherein the slot formed in the cylindrical part extends non-parallel to the center axis of the cylindrical part, the suspension part of the suspension device oriented parallel to the center axis.

15. The combination according to claim 8 wherein the inner axial end of the loop bears against the circular plate of the hole saw blade.

16. The combination according to claim 8 wherein an inner cylindrical surface of the loop facing the center axis carries indicia.

17. The combination according to claim 8 wherein the outer axial end faces in an axial direction away from the circular plate.

* * * * *